TELEPHONE HAND SET TRANSMITTER DISCONNECTOR DEVICE

Filed May 17, 1956

INVENTOR.
Abraham Leifer

BY L. S. Saulsbury

ATTORNEY 2,838,615

TELEPHONE HAND SET TRANSMITTER DISCONNECTOR DEVICE

Abraham Leifer, Newark, N. J.

Application May 17, 1956, Serial No. 585,414

3 Claims. (Cl. 179—158)

Figures 1, 2, 3:
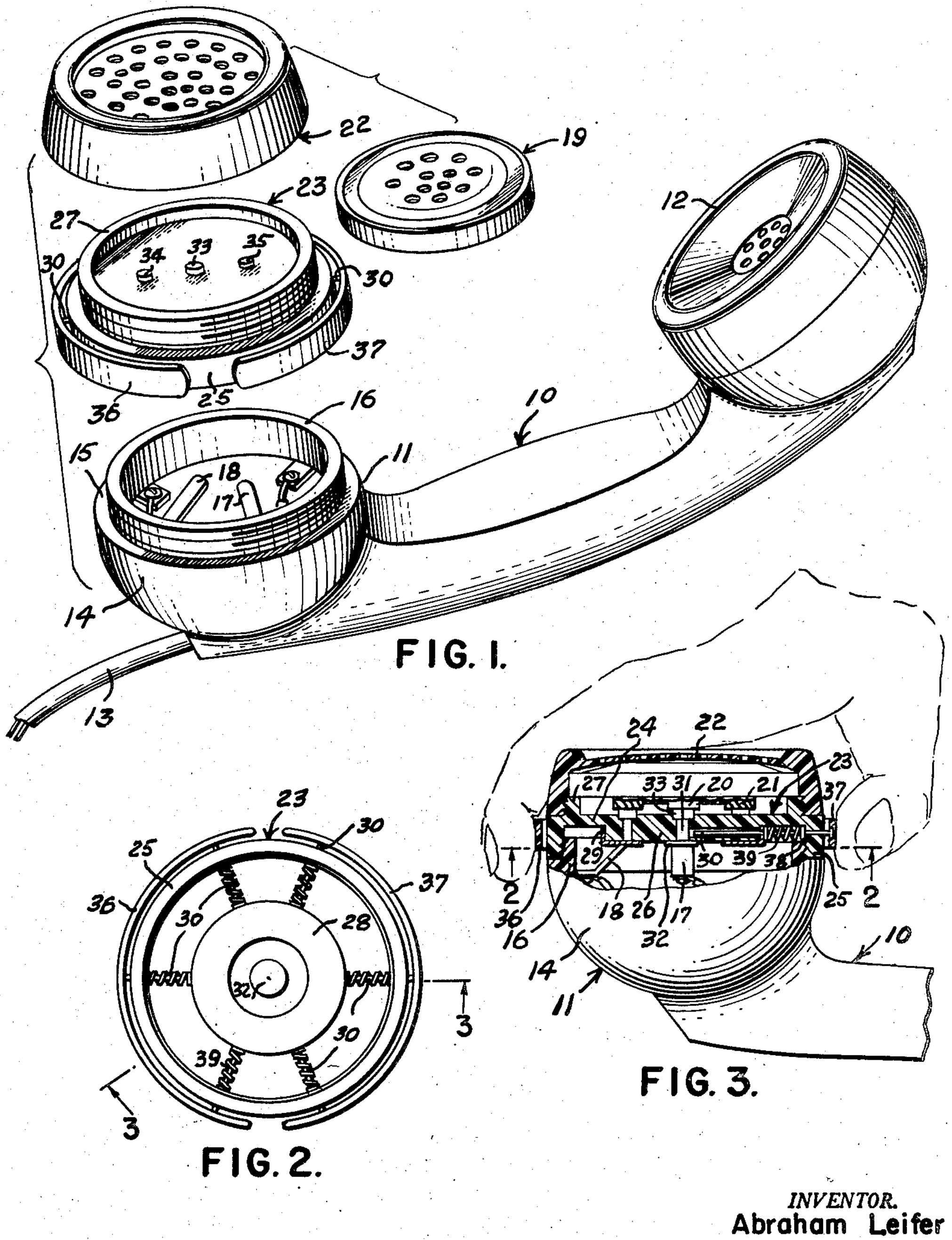

This invention relates to a voice cutout device for telephone transmitters.

It is the principal object of this invention to provide a voice switch cutout device for telephone transmitters which can be attached to the transmitter in a mechanical manner by merely removing the internally-threaded mouthpiece and the transmitter capsule unit and inserting between the same and the transmitter housing the switch cutout device having terminals adapted to engage with the spring contacts in the transmitter housing and transmitter terminals placing the transmitter unit inside the cutout device and fixing the mouthpiece to the cutout device.

It is another object of the invention to provide a voice cutout device for telephone transmitters having an operating finger control element which is readily accessible to the hand while the telephone hand set is being lifted for use and so that the user of the cutout device need not lower the hand set to cutout his voice at times when the conversation is directed to others in the room and not intended for the party on the other end of the telephone line.

Other objects of the invention are to provide a voice cutout device for telephone transmitters and particularly for hand set transmitters, which is of simple construction, inexpensive to manufacture, easy to assemble upon the telephone hand set, does not require alterations in the wiring system of the transmitter, of pleasing appearance, compact, efficient and effective in use.

For a better understanding of the invention, reference may be had to the following detailed description taken in connection with the accompanying drawing, in which Figure 1 is a perspective and exploded view of a hand set and of the parts thereof including the present voice cutout device adapted to be fitted within the same, Fig. 2 is a bottom plan view of the cutout device showing the concentric contacts and the multiple angularly-spaced switch bridging contact rods therefor, and Fig. 3 is a transverse sectional view of the cutout device taken generally on line 3—3 of Fig. 2 and of the hand set transmitter parts assembled thereupon.

Referring now to the figures, 10 represents a telephone hand set having a transmitter assembly 11 on one end, a receiver assembly 12 on the other end and a cable 13 that extends from the hand set to the telephone base. The transmitter assembly includes a housing 14 with a shoulder 15 and an upstanding externally-threaded sleeve portion 16. Within the housing 14 are spring terminals 17 and 18, one of which extends substantially to the center of the instrument and the other of which extends to a location which is radially offset from the center one. The transmitter usually has a transmitter capsule unit 19 within its housing 14 that is provided with concentric terminals 20 and 21 for engagement with the respective spring terminals 17 and 18. This diaphragm unit 19 is ordinarily held within the housing 14 and against the terminals 17 and 18 by a perforated mouthpiece 22 that is threaded upon the sleeve portion 16 and lies flush against the shoulder 15. By removing the mouthpiece 22 and the transmitter unit 19 the hand set is made ready for the insertion of the present cutout device 23.

This cutout device 23 has an insulated body 24 with a depending internally-threaded attaching portion 25 that can be secured to the threaded portion 16 of transmitter housing 14 in the same manner that the mouthpiece is secured thereto. The insulated body 24 has a central thickened portion 26 depending therefrom and of less diameter than the threaded portion 25. It also has an upstanding externally-threaded portion 27 to which the mouthpiece 22 is attached to retain the transmitter unit 19 within the cutout device.

An annular ring contact 28 having a peripheral flange 29 is fitted tightly upon the depending thickened portion 28. A plurality of pin contacts 30 are slidable radially through the attaching sleeve portion 25 and the thickened portion 26 to engage a central contact member 31 that has a bottom contact plate 32 engaged by the central terminal 17. The annular contact 28 is engaged by the offset spring terminal 18. The upper end of the central contact member 31 has a head 33 that is engaged by the central terminal 20 of the transmitter unit 19. Two headed contact plugs 34 and 35 are radially spaced from the central contact head 33 and extend through the thickened portion 26 from the annular contact ring 28 and are engaged by the annular ring 21 of the transmitter unit 19. The slidable pin contacts 30 extend outwardly beyond the outer periphery of the cutout body 24 and are angularly spaced from each other. There are three such pin contacts on each side of the body. An arcuate strip 36 is connected between the pin contacts on the opposite side thereof. These arcuate strips are concentric with the outer periphery of the body and upon being depressed by the thumb or fingers as the hand set is held in the hand can be moved inwardly. Each of these pins have a fixed collar and a compression spring 39 surrounding the pin, and contacting and reacting against flange 29 of annular contact 28 and the fixed collar 38 to normally maintain the inner ends of the pin contacts out of engagement with the central contact member 31. Upon the pin contacts being depressed the center contact 31 is engaged to cut out the transmitter unit 19 of the telephone transmitter and render it ineffective. It will be seen that the arcuate strip members 36 and 37 extend together substantially throughout the entire periphery of the cutout body 24 so that at least one of the pin contacts at any location therearound will upon squeezing these arcuate members short circuit the transmitter.

It will be seen that this cutout device 23 can be easily placed within the housing 14 without severing or reforming any part of the transmitter except for the temporary removal of the mouthpiece 22 from the housing 14.

The user of the telephone hand set can while holding the handset to the ear and mouth with one hand, disconnect the transmitter by simply applying the other hand to the transmitter. The cutout device can be readily installed by the user of the regular telephone handset himself.

While various changes may be made in the detailed construction, it shall be understood that such changes shall be within the spirit and scope of the present invention as defined by the appended claims.

What is claimed is:

1. A voice cutout device for a telephone transmitter that has a housing with spring contacts therein and a detachable mouthpiece, said cutout device comprising an insulated body having a threaded sleeve portion adapted for engagement with the housing of a telephone transmitter when made free of its mouthpiece, contact means extending axially between the opposite sides of the body, one side of said contact means adapted to be engaged by the spring contacts of the transmitter housing, a second threaded sleeve portion extending from the opposite side of the insulated body and adapted to receive a transmitter unit and the mouthpiece so that the contacts of the transmitted unit may engage the other side of the contact means, depressible switch contact means extending radially through the insulate body to the exterior thereof and operable to bridge said axially extending contact means upon being depressed to short circuit them so as to render the transmitter unit ineffective.

2. A voice cutout device for telephone transmitters as defined in claim 1, said insulated body having a depending central portion, said axially extending contact means including an annular contact surface surrounding and fitted upon said depending portion and having a flange engaging with the peripheral wall thereof and a central contact extending through the body portion and having a contact surface on the base of the depending portion centrally of the annular contact, said depressible contact means including slidable pin contacts extending radially through the flange of the annular contact and the depending portion and adapted to engage the central contact when depressed, each of said slidable pin contacts having a fixed collar, and a compression spring surrounding the pin contact and extending between the collar and the flange of the annular contact to normally urge the outward displacement of the pin contact, arcuate members bridging certain of the pin contacts on the opposite sides of the device, whereby said device can be operated from substantially any location surrounding the same.

3. In combination, a telephone transmitter housing having spring contacts therein, said transmitter housing having a mouthpiece attaching portion, a voice cutout element having contacts and adapted to engage the spring contacts of the housing and extending axially therethrough, a transmitter element carried on the voice cutout element and engaging the contacts thereof, a mouthpiece element secured to the mouthpiece attaching portion of the housing to hold the assembly together and switch means on one of the elements adapted to engage with the contacts of the cutout element and operable to bridge said contact elements so that the transmitter element may be rendered ineffective.

References Cited in the file of this patent

UNITED STATES PATENTS 2,403,498 Brittingham ------------ July 9, 1946